United States Patent [19]

Kumasaka et al.

[11] Patent Number: 4,810,298
[45] Date of Patent: Mar. 7, 1989

[54] MANUFACTURING METHOD OF ASPHALT FOAM

[75] Inventors: Sadao Kumasaka; Koretoshi Katsuki, both of Tokyo, Japan

[73] Assignee: Toyo Chemical Industry Co., Ltd., Tokyo, Japan

[21] Appl. No.: 127,596

[22] Filed: Dec. 2, 1987

Related U.S. Application Data

[63] Continuation of Ser. No. 918,690, Oct. 16, 1986, which is a continuation of Ser. No. 796,500, Nov. 8, 1985, abandoned, which is a continuation of Ser. No. 569,767, Jan. 10, 1984, abandoned.

[51] Int. Cl.$^4$ ............................................. C08L 95/00
[52] U.S. Cl. ................................. 106/284.4; 106/277; 521/101; 521/110; 521/122
[58] Field of Search ............... 106/273 R, 277, 273 N; 521/81, 101, 110, 122

[56] References Cited

U.S. PATENT DOCUMENTS 3,835,117 9/1974 Walaschek ............................ 524/60
3,932,331 1/1976 Doi et al. ............................ 427/138

OTHER PUBLICATIONS

Derwent Abstract Accession No. 84-021174/04, Japanese Patent No., J58213029, 12/10/83.

Primary Examiner—Amelia Burgess Yarbrough
Attorney, Agent, or Firm—Frishauf, Holtz, Goodman & Woodward

[57] ABSTRACT

A method of manufacturing asphalt foam comprising the steps of preparing polyether polyol containing 15 mole % or more of ethylene oxide, preparing urethane prepolymer by making the polyether polyol react with organic isocyanate, and obtaining asphalt foam by mixing the urethane prepolymer with (i) a silicone oil and (ii) an aqueous emulsion of asphalt to obtain an asphalt foam having a five cell structure and excellent water repellancy.

2 Claims, No Drawings

MANUFACTURING METHOD OF ASPHALT FOAM

This application is a continuation, of application Ser. No. 918,690, filed Oct. 16, 1986, which is a continuation of Ser. No. 796,500 filed Nov. 8, 1985 (abandoned); which is a continuation of Ser. No. 569,767 filed Jan. 10, 1984 (abandoned).

BACKGROUND OF THE INVENTION

The present invention relates to a method of manufacturing asphalt foam applicable for various types of joint filling material, and more particularly to a method of manufacturing asphalt foam with a fine foam structure and an excellent water stop function.

Some essential natures such as repellent and slow restoration are required for the joint filling material widely used in housing, vehicles, construction works, etc. One of the known joint filling materials is so-called asphalt foam having a repellent as the characteristic of asphalt and a restoring force of foam. Some of the known asphalt foams of this type are, for example, an asphalt foam in which asphalt is melted and impregnated into flexible urethane foam, and an asphalt foam in which a foam of open-cell type is impregnated with asphalt emulsion. This type asphalt foam has a good repellent due to the asphalt impregnant and a slow restoring force appropriate to the joint filling material since the restoring force peculiar to the foam is properly reduced by the asphalt. In both the above examples of asphalt foams, the foam is impregnated with asphalt. Therefore, the conventional asphalt foams inevitably suffer from nonuniform impregnation of asphalt, resulting in nonuniform quality of the products of asphalt foam. The asphalt sticked to the cell walls as the result of the impregnation is relatively easy to be taken off. Therefore, when it is repeatedly subjected to compression, the asphalt impregnant is gradually removed, leading to quality deterioration of the asphalt foam.

SUMMARY OF THE INVENTION

Accordingly, an object of the present invention is to provide an asphalt foam with a good water stop and free from nonuniformity and deterioration of the quality of the manufactured asphalt foam.

According to the present invention, there is provided a method of manufacturing asphalt foam comprising the steps of preparing polyether polyol containing at least 15 mole % of ethylene oxide, preparing urethane prepolymer by making the polyether polyol react with organic isocyanate, and obtaining asphalt foam by mixing the urethane prepolymer with aqueous emulsion of asphalt.

In the method according to the present invention, one kind of the polyether polyol may be used. Alternatively, two or more kinds of polyether polyols may be used in a manner that these polyether polyols are mixed so as to have ethylene oxide content of 15 mole % or more. Further, in mixing step of the aqueous emulsion of asphalt with urethane prepolymer, silicone oil may further be added. The addition of the silicone oil makes the cell structure of the resultant asphalt foam finer, resulting in further improvement of the water stop function. In this case, a preferable amount of silicone oil is 0.5 to 20 parts by weight.

DETAILED DESCRIPTION OF THE PREFERRED EMBODIMENTS

The aqueous emulsion of asphalt used in the present invention can be prepared by a known emulsion technique, viz. in such a way that cationic or anionic surface active agent is used and asphalt is put into water, and agitated and dispersed therein. The asphalt to be used may be natural asphalt, straight asphalt as the residue product after distillation of the asphalt-base crude oil, or blown asphalt obtained by polymerizing the straight asphalt with heated air. A weight ratio of asphalt to water is preferably 1: 0.3 to 2.0. For less than 0.3 of water, it is difficult to obtain a uniform emulsion. For 2.0 or more of water, the asphalt amount is insufficient to provide the asphalt foam with satisfactory function.

The urethane prepolymer used in the present invention functions as a foaming agent, and also as a binder or a filler while staying in the asphalt foam. 5 to 250 parts by weight of the urethane prepolymer may be added to 100 parts by weight of the asphalt emulsion. The obtained asphalt foam according to the present invention satisfactorily functions as the joint filling material. Particularly when the asphalt foam rich in asphalt, is used in the form of a molded product, the applying operation of the asphalt foam is remarkably improved.

In the present invention, when the asphalt emulsion and the urethane prepolymer are mixed and agitated, water in the asphalt emulsion reacts with free isocyanate radical in the urethane prepolymer, as in the following formula, to produce carbon dioxide gas.

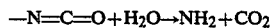

$$-N{=}C{=}O + H_2O \rightarrow NH_2 + CO_2$$

Asphalt particles are uniformly dispersed in the mixture by the foaming action of the generated carbon dioxide gas and the mixing operation due to the agitation. Therefore, the manufactured asphalt foam are free from an irregular distribution of asphalt, and are uniform in the product quality. Further, in the asphalt foam of the present invention, the asphalt per se constitute the foam frame. Because of this, the asphalt is never separated from the foam structural frame, unlike the conventional foam in which the synthetic resin foam is impregnated with asphalt. Thus, according to the present invention, the asphalt foam obtained is not deteriorated in its quality and has a good durability.

If the water contained in the aqueous asphalt emulsion is insufficient for foaming the urethane prepolymer, it is sufficient that a proper amount of water is added to and mixed with the emulsion. It is allowed to add a filler, such as aluminum hydroxide, clay, calcium carbonate; a pigment; a rust preventive; and a fungistat; etc. to the emulsion.

Examples according to the present invention will be described below.

(i) To obtain aqueous asphalt emulsion, 50 parts by weight of blown asphalt, 50 parts by weight of water, 0.3 parts by weight of sodium alkylsulfuric acid as a surface active agent are uniformly mixed by a homogenizer.

(ii) Trifunctional polyether polyol having 80 mole % of ethylene oxide (EO) and 3000 molar weight, and tolylene diisocyanate are mixed and agitated at 85° C. for four hours to obtain urethane prepolymer containing 15.0 % of NCO. This prepolymer will be called a prepolymer A.

(iii) Trifunctional polyether polyol of 80 mole % of EO and 3000 molar weight and trifunctional polyether polyol having 100% of propylene oxide and 3000 molar weight are mixed to have polyether polyol containing EO content of 75 mole %. The polyether polyol mixture and tolylene diisocyanate are mixed and agitated for 4 hours at 85° C. to obtain urethane prepolymer containing 9.2% of NCO. This polymer will be called a prepolymer B.

(vi) The prepolymer A is mixed with the asphalt emulsion of (i) above under the presence or absence of silicone oil to form five types of asphalt foams as shown in the following Table-1. The specific gravities of the asphalt foams are shown in the following table.

TABLE 1

|  | 1 | 2 | 3 | 4 | 5 |
|---|---|---|---|---|---|
| Asphalt emulsion* | 100 | 100 | 100 | 100 | 100 |
| Urethane Prepolymer* | 20 | 30 | 20 | 30 | 50 |
| Silicone oil* | 0 | 0 | 1.0 | 1.0 | 1.5 |
| Specific gravity | 0.30 | 0.18 | 0.27 | 0.16 | 0.11 |

*Each of the components is expressed in parts by weight.

(v) The prepolymer B and the silicone oil are mixed with the asphalt emulsion of (i) above, as shown in Table-2. The mixture is expanded to form 9 types of asphalt foams. These asphalt foams have respectively specific gravities, as shown in the following table.

TABLE 2

|  | 6 | 7 | 8 | 9 | 10 | 11 | 12 | 13 | 14 |
|---|---|---|---|---|---|---|---|---|---|
| Asphalt emulsion* | 100 | 100 | 100 | 100 | 100 | 100 | 100 | 100 | 100 |
| Urethane Prepolymer* | 5 | 10 | 30 | 40 | 50 | 70 | 100 | 40 | 25 |
| Silicone oil* | 0.5 | 1.0 | 1.0 | 1.0 | 1.5 | 1.5 | 1.5 | 20 | 20 |
| Specific gravity | 0.7 | 0.55 | 0.35 | 0.25 | 0.15 | 0.10 | 0.06 | 0.43 | 0.55 |

*Each of the components is expressed in parts by weight.

The asphalt foams 1 to 14 shown in the Table-1 and Table-2 are each formed into a string of 15 mm thickness, 15 mm width and 30 cm length. Both ends of the string are bonded with each other to form a ring like asphalt foam. The ring like asphalt foam is bonded at one side to an acrylic resin plate. In a liquid bath, another acrylic resin plate is set on the other side of the ring like asphalt foam to fill with water a space defined by the ring like asphalt foam and the acrylic resin plates. Then, the ring like asphalt foam sandwiched by the acrylic plates is taken out from the liquid bath. Under this condition, the ring like asphalt foam is compressed by 50% and fixed by a plurality of bolts to seal the space containing water. After 24 hours, it is checked whether or not water in the space leaks therefrom. The check result was no leakage of the water. In this respect, the asphalt foam according to the present invention has an excellent water stop effect.

What is claimed is:

1. A method of manufacturing asphalt foam comprising the steps of:
   preparing a polyether polyol containing at least 15 mole % of ethylene oxide;
   reacting said polyether polyol with an organic isocyanate to form a urethane prepolymer; and
   mixing said urethane prepolymer with (i) a silicone oil and (ii) an aqueous emulsion of asphalt to form an asphalt foam having a fine cell structure and improved water repellancy; said silicone oil is mixed in an amount from 0.5 to 20 parts by weight based on 100 part by weight of said aqueous emulsion of asphalt; and said polyurethane prepolymer is mixed in an amount from 50 to 250 parts by weight based on 100 parts by weight of said aqueous emulsion of asphalt.

2. The method according to claim 1, in which a weight ratio of asphalt to water is 1: 0.3 to 2.0.

* * * * *

UNITED STATES PATENT AND TRADEMARK OFFICE
CERTIFICATE OF CORRECTION

PATENT NO. : 4,810,298
DATED : March 7, 1989
INVENTOR(S) : KUMASAKA et al

It is certified that error appears in the above-identified patent and that said Letters Patent is hereby corrected as shown below:

On the title page, the name of the Assignee should read:
  --Toyo Rubber Chemical Industry Co., Ltd.--

In the title page, add

--FOREIGN PATENT DOCUMENTS
    47336    3/1982     Japan--.

Signed and Sealed this

Tenth Day of November, 1992

Attest:

DOUGLAS B. COMER

*Attesting Officer*        Acting Commissioner of Patents and Trademarks